Figure 1:
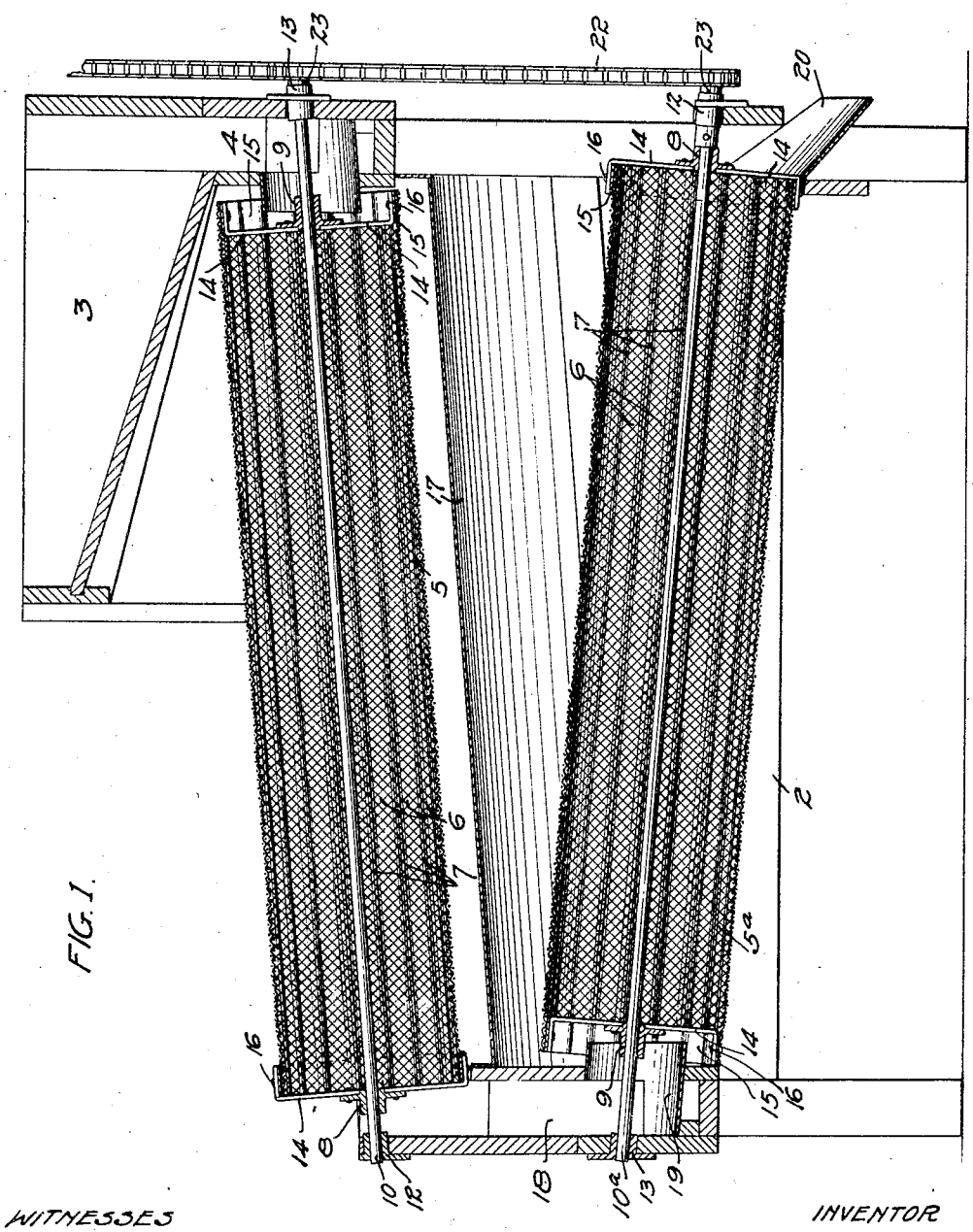

R. L. OWENS.
WILD OATS SEPARATOR.
APPLICATION FILED MAR. 14, 1918.

1,400,233.

Patented Dec. 13, 1921.
2 SHEETS—SHEET 1.

WITNESSES

INVENTOR
RICHARD L. OWENS
BY
ATTORNEYS

R. L. OWENS.
WILD OATS SEPARATOR.
APPLICATION FILED MAR. 14, 1918.
1,400,233.
Patented Dec. 13, 1921.
2 SHEETS—SHEET 2.
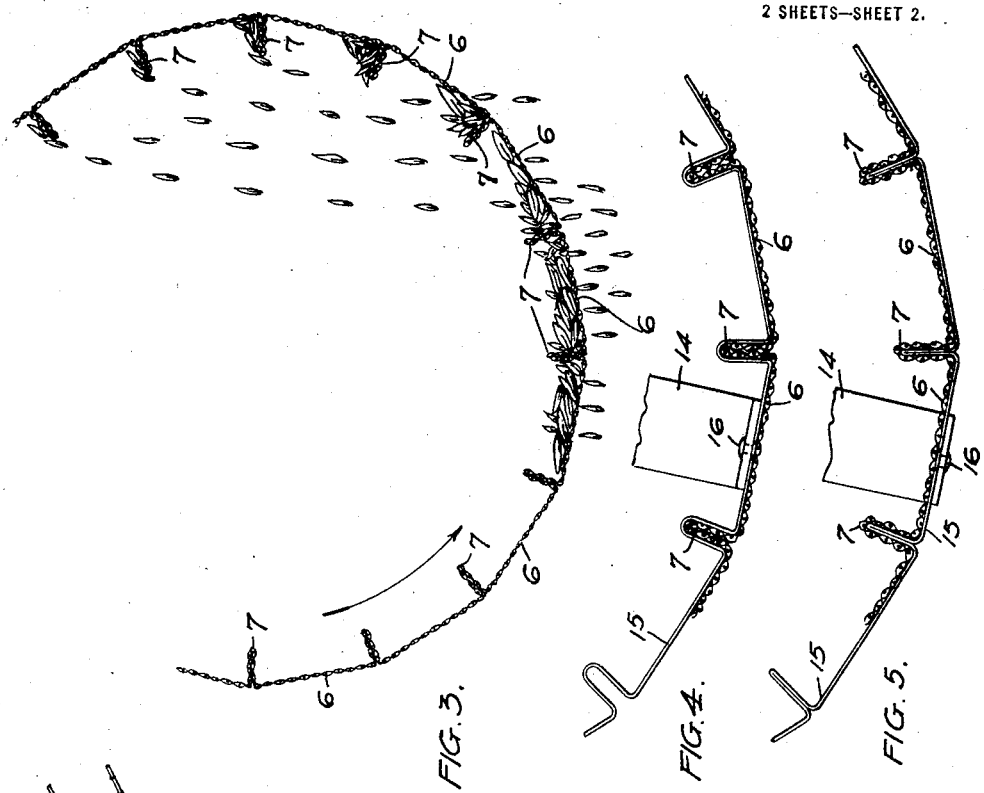
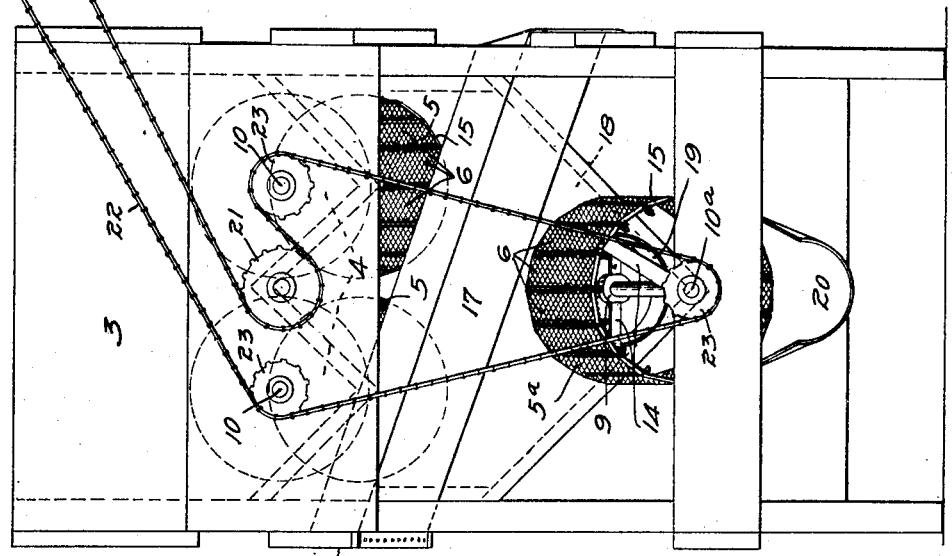
WITNESSES
INVENTOR
RICHARD L. OWENS
BY
ATTORNEYS

UNITED STATES PATENT OFFICE.

RICHARD L. OWENS, OF MINNEAPOLIS, MINNESOTA.

WILD-OATS SEPARATOR.

1,400,233.  Specification of Letters Patent.  Patented Dec. 13, 1921.

Application filed March 14, 1918. Serial No. 222,389.

*To all whom it may concern:*

Be it known that I, RICHARD L. OWENS, a citizen of the United States, resident of Minneapolis, county of Hennepin, State of Minnesota, have invented certain new and useful Improvements in Wild-Oats Separators, of which the following is a specification.

A wild oat grain, besides being distinguished by its color from the tame, is further characterized by its long, slender shape, while the tame oats, although slender as compared with wheat or barley, are plumper and fuller through the middle of the kernel and at the head than the wild oats. The dark color of the wild oat grain and the fact of its being composed largely of husk make its presence objectionable in tame oats, reducing the marketable value and price thereof.

The object, consequently, of my invention is to provide an apparatus by means of which the long, slender kernels of grains of wild oats can be easily and effectually separated from the fuller, plumper kernels of tame oats, advantage being taken of the difference in shape of the grains.

A further object is to provide a machine of simple construction and large capacity and one which will effectually perform the separating operation desired.

The invention consists generally in various constructions and combinations, all as hereinafter described and particularly pointed out in the claims.

In the accompanying drawings forming part of this specification,

Figure 1 is a vertical sectional view through an oats separator embodying my invention, Fig. 2 is an end elevation of the same, Fig. 3 is a transverse sectional view through one of the sieves, showing the manner of separating the wild from the tame oats, Fig. 4 is a detail sectional view, showing the manner of mounting the supporting band or hoop at one end of the rotary sieve, Fig. 5 is a similar view, showing the arrangement of the band at the opposite end of the sieve.

In the drawing, 2 represents a suitable frame, in which the separating apparatus is mounted. 3 is a hopper mounted in the upper portion of the frame, having a gravity feed opening 4 through which the mixture of tame and wild oats is delivered.

I prefer to provide two rotary sieves in the top of the machine, each composed of a wire mesh 5 folded to form an elongated member provided with a plurality of flat screening surfaces 6 alternating with inwardly projecting ledges or shelves 7 extending lengthwise of the sieve, preferably from end to end thereof. These ledges are formed by crimping and squeezing together longitudinal sections of the wire mesh and each ledge is of sufficient width to raise the mixture of tame and wild oats a sufficient distance so that, as the kernels roll or slide off the ledges on the outside of the screen they will assume a vertical position in falling and be presented endwise to the flat screening surfaces between the ledges in the lower portion of the screen. Generally the mixture will be carried up to a point beyond or near the level of the center of the sieve and dropping back the oat kernels will fly end first toward the flattened area 6 and the comparatively thin or slender heads of the wild oats will pass through the meshes of the sieve and out of the machine, while the plumper tame oats will either lodge in the meshes to fall off sidewise later in the revolution of the sieve or will strike and rebound and gradually work down the inclination of the sieve to the discharge end thereof.

The ledges being each composed of a double thickness of the wire mesh, will not allow either the tame or wild oat kernels to pass through or even to lodge except temporarily thereon, the function of the ledges being to raise the stream of mixed tame and wild oats a sufficient distance above the bottom of the sieve so that in falling from the ledges the kernels will assume an endwise position and the thin slender ones, which will include the wild oats and the imperfect tame oat kernels, will pass rapidly through the meshes of the flat screening surfaces between the ledges while the plumper kernels will either rebound therefrom and travel down the inclination of the screen and thereby be separated from the tame oats or if they lodge in the meshes they will later fall out by gravity and mingle with the other plump kernels in the stream flowing over the bottom of the sieve, the thin imperfect kernels and the wild oats passing through the sieve will be discharged upon the ground or into a receptacle, such as the pan 17 arranged beneath said sieves.

I prefer to provide two of the sieves in the top of the machine, arranged side by side, the discharge opening 4 being divided to direct a part of the stream to each of the sieves. The number of sieves is not however material. Each sieve has hubs 8 and 9 thereon, mounted on shafts 10 which have bearings at 12 and 13 in the frame of the machine.

The hubs have bars 14 radiating therefrom at intervals in the form of spokes and at the upper ends of the sieves, bands 15 preferably of sheet metal, are provided, fitting within the said ends of the sieves and secured by suitable means, such as rivets 16, to the bars 14.

At the lower ends of the sieves 5 I prefer to provide a hopper 18 to receive the plump kernels of tame oats for delivery to a short spout section 19 which in turn delivers the kernels to a sieve 5ª corresponding to those described and mounted on a similar shaft 10ª and inclined downwardly and toward the opposite end of the machine or the receiving end of the sieves 5. This sieve 5ª is made in substantially the same manner as the sieve described and provided with corresponding ledges on which the mixture of tame and wild oats is subjected to a similar treatment, the thin wild oat kernels passing endwise through the flat surfaces in the bottom of the sieve, while the oat kernels are carried along to a suitable discharge spout 20. This lower sieve is preferably provided for the reason that some of the wild oats may still be mixed with the tame oats when discharged from the upper sieves or there may still be some imperfectly formed tame oat kernels in the mixture. The machine in effect provides a double separation and when the oats have been passed through both sets of sieves the discharge at the lower end of the lower sieve will be practically clean and composed entirely of full plump tame oat kernels suitable for seed.

Any suitable means may be employed for driving the sieves, but I prefer to provide a drive sprocket 21 having a belt 22 engaging similar sprockets 23 on the shafts of the sieves for revolving them in the same direction, the belt then passing to another operating part of the machine, such as the bagger. The sieves may be operated at any desired speed found to be most effective for the proper separation of the wild from the tame oats.

By making the meshes of the sieve larger I am able to use this machine for separating tame oats from wheat or barley, in which advantage will be taken of the difference in shape of the kernels, the oats falling lengthwise through the meshes of the screen in substantially the same manner as described above with reference to the wild oat kernels, while the grains of wheat and barley, being thicker and plumper, will either lodge in the meshes, which are too small to allow their passage, or will rebound thereover. The principle of separation will be the same in both cases.

I claim as my invention:

1. An apparatus for separating oats from other grain comprising a frame, an inclined cylindrical sieve mounted to revolve therein and composed of a wire mesh having a plurality of flat surfaces formed therein alternating with inwardly projecting ledges, the mixture of oats and other grains being introduced into one end of said sieve and gathered up by said ledges as the sieve revolves, the mixture sliding over the edges of said ledges on the upside of the sieve and falling endwise upon said flattened surfaces, the meshes of the sieve being sufficiently large to allow the long, comparatively thin oat kernels to pass therethrough but arresting the passage of the plumper grain the surfaces of said ledges being at right angles substantially to said flat surfaces, whereby the kernels of grain will be carried a considerable distance on the upside of the sieve.

2. An apparatus for separating oats from other grain comprising a frame, a revolving cylindrical sieve therein composed of wire mesh having a series of flat separating surfaces and a series of inwardly projecting ledges between said surfaces extending from end to end of said sieve, said wire mesh being folded or crimped longitudinally at regular intervals between said flattened surfaces to form said inwardly projecting ledges, the walls of each ledge being pressed into parallel relation, the mixture being delivered to one end of the sieve and said ledges elevating it as the sieve revolves and the mixture flowing over said ledges on the upside of the sieve and dropping vertically upon said flattened surfaces, the slender oats passing through the meshes while the plumper grains rebound or lodge therein.

3. An apparatus for separating wild from tame oats comprising a frame, a pair of inclined revolving sieves mounted in the upper portion of said frame and having open ends for receiving and discharging the grain, a third revolving sieve mounted beneath said pair and having means for receiving the grain discharged from both of the sieves above, each sieve being composed of wire mesh having a series of inwardly projecting ledges formed lengthwise therein with flattened separating surfaces between them, the mixture being carried up by said ledges and discharged upon the lower walls of the sieves, the thin wild oats passing through the meshes of said flattened surfaces while the tame oats rebound or lodge therein.

4. A sieve for separating wild from tame oats comprising a wire mesh having a plurality of flattened separating surfaces formed therein the walls of said mesh between said separating surfaces being folded inwardly to form longitudinal ledges within said sieve and the sides of each ledge being pressed into substantially parallel relation, and bands provided at the ends of the mesh seated on said flattened surfaces and having loops formed therein for engaging and bracing the walls of said ledges.

5. An apparatus for separating wild from tame oats comprising a frame, a pair of inclined revolving sieves mounted in parallel relation in the upper portion of said frame and having open ends for receiving and discharging the grain, a third revolving sieve mounted beneath said pair and oppositely inclined and having an open upper end positioned to receive the material from the lower ends of said upper sieves, each sieve being composed of wire mesh having a series of inwardly projecting ledges extending lengthwise thereof with flattened separating surfaces between them, the mixture carried up by the ledges of said revolving sieves dropping from the upper portion thereof and the thin wild oats passing through the meshes of the lower portions of said sieves while the tame oats rebound or lodge therein.

In witness whereof, I have hereunto set my hand this 4th day of March, 1918.

RICHARD L. OWENS.